United States Patent
Oblak et al.

(10) Patent No.: US 11,650,147 B2
(45) Date of Patent: May 16, 2023

(54) SYSTEMS, METHODS, AND APPARATUSES FOR REAL-TIME CHARACTERIZATION OF ROCK CUTTINGS DURING ROCK DRILL CUTTING

(71) Applicant: Caterpillar Inc., Peoria, IL (US)

(72) Inventors: Tod A. Oblak, Pittsburgh, PA (US); Lyle Taylor, Export, PA (US); James Peterson, Denison, TX (US); Carl Hendricks, Mosman Park (AU); John F. Halterman, Sherman, TX (US); Lawrence A. Mianzo, Pittsburgh, PA (US); Narayana G. Nadukuru, Sewickley, PA (US)

(73) Assignee: Caterpillar Inc., Peoria, IL (US)

( * ) Notice: Subject to any disclaimer, the term of this patent is extended or adjusted under 35 U.S.C. 154(b) by 120 days.

(21) Appl. No.: 17/210,554

(22) Filed: Mar. 24, 2021

(65) Prior Publication Data

US 2022/0307978 A1    Sep. 29, 2022

(51) Int. Cl.
*G01N 21/3563* (2014.01)
*E21B 21/015* (2006.01)
(Continued)

(52) U.S. Cl.
CPC ....... *G01N 21/3563* (2013.01); *E21B 21/015* (2013.01); *E21B 49/005* (2013.01); *G01N 21/359* (2013.01); *E21B 7/02* (2013.01)

(58) Field of Classification Search
CPC ........ E21B 21/015; E21B 49/005; E21B 7/02; G01N 21/3563; G01N 21/359
See application file for complete search history.

(56) References Cited

U.S. PATENT DOCUMENTS

| 5,044,756 A | 9/1991 | Gaultney |
|---|---|---|
| 6,845,657 B2 | 1/2005 | Williams |

(Continued)

FOREIGN PATENT DOCUMENTS

| CN | 108051375 A | 5/2018 |
|---|---|---|
| CN | 108152216 A | 6/2018 |

(Continued)

OTHER PUBLICATIONS

Written Opinion and International Search Report for Int'l. Patent Appln. No PCT/US2022/020698, dated June 30, 2022 (10 pgs).

*Primary Examiner* — D. Andrews
*Assistant Examiner* — Yanick A Akaragwe

(57) ABSTRACT

A system, method, and apparatus for real-time characterization of drilled particles during a drilling operation can be comprised of a light illumination source to output short-wave-infrared (SWIR) light toward the drilled particles as the drilled particles exit a drill hole being drilled by a drilling machine; a sensor to sense reflected short-wave-infrared (SWIR) light reflected from the drilled particles exiting the drill hole; and processing circuitry operatively coupled to at least the sensor. The processing circuitry can be configured to determine a spectrum of the reflected short-wave-infrared light sensed by the sensor, and determine particle characterization for a portion of the drilled particles by performing hyperspectral analysis on the determined spectrum and based on predetermined candidate particle characterizations.

18 Claims, 3 Drawing Sheets

(51) Int. Cl.
*G01N 21/359* (2014.01)
*E21B 49/00* (2006.01)
*E21B 7/02* (2006.01)

(56) References Cited

U.S. PATENT DOCUMENTS

| | | | |
|---|---|---|---|
| 8,857,915 B2 | 10/2014 | Nieto et al. | |
| 9,016,399 B2 | 4/2015 | Pelletier et al. | |
| 10,101,486 B1 | 10/2018 | Palmer et al. | |
| 2012/0187286 A1* | 7/2012 | Auranen | G01N 23/223 |
| | | | 250/255 |
| 2014/0020954 A1* | 1/2014 | Pelletier | G01N 21/31 |
| | | | 356/402 |
| 2014/0333754 A1* | 11/2014 | Graves | E21B 47/002 |
| | | | 348/85 |
| 2016/0130928 A1 | 5/2016 | Torrione | |
| 2017/0298726 A1* | 10/2017 | Smith | E21B 49/005 |
| 2017/0314381 A1* | 11/2017 | Vandapel | G05D 1/0088 |

FOREIGN PATENT DOCUMENTS

| | | | | |
|---|---|---|---|---|
| CN | 106682377 B | 1/2019 | | |
| CN | 110907379 A | 3/2020 | | |
| CN | 110261329 B | 10/2020 | | |
| WO | 2011007053 W | 1/2011 | | |
| WO | WO-2021054840 A1 * | 3/2021 | | E21B 47/002 |

\* cited by examiner

SYSTEMS, METHODS, AND APPARATUSES FOR REAL-TIME CHARACTERIZATION OF ROCK CUTTINGS DURING ROCK DRILL CUTTING

TECHNICAL FIELD

The present disclosure relates to real-time analysis of rock cuttings, and more particularly to systems, methods, and apparatuses for real-time characterization of rock cuttings ejected from a drill hole during a drilling operation of a drilling machine.

BACKGROUND

Conventionally, to identify ore quality, samples can be extracted from various areas of a mine site, and the samples can be sent to a laboratory for analysis. However, the process of sending the samples to the laboratory, the laboratory performing the analysis, and the laboratory sending a report regarding the quality of the samples may be too time consuming and can adversely affect the overall efficiency of mining operations.

U.S. Pat. No. 9,016,399 ("the '399 patent") describes an apparatus and method for lithology and mineralogy determinations. According to the '399 patent, cuttings are retrieved from a well bore while drilling the formation and a hyperspectral image of the cuttings is continuously obtained. The '399 patent goes on to describe that the hyperspectral image of the cuttings is analyzed to determine formation characteristics. However, the '399 patent is not understood to perform the analysis at the well bore, and, moreover, is understood to perform the analysis after a separation process on drilling mud to separate the cuttings from drilling fluid introduced into the well bore.

SUMMARY

According to aspects of one or more embodiments of the disclosed subject matter, a system, method, and apparatus for real-time characterization of drilled particles during a drilling operation can comprise or implement a light illumination source to output short-wave-infrared (SWIR) light toward the drilled particles as the drilled particles exit a drill hole being drilled by a drilling machine; a sensor to sense reflected short-wave-infrared (SWIR) light reflected from the drilled particles exiting the drill hole; and processing circuitry operatively coupled to at least the sensor. The processing circuitry can be configured to determine a spectrum of the reflected short-wave-infrared light sensed by the sensor and to determine particle characterization for a portion of the drilled particles by performing hyperspectral analysis on the determined spectrum and based on predetermined candidate particle characterizations.

In another aspect a system can comprise: a light illumination source to output short-wave-infrared (SWIR) light toward drilled particles as the drilled particles exit a drill hole being drilled by a drilling machine; a sensor to sense reflected short-wave-infrared (SWIR) light reflected from the drilled particles exiting the drill hole; and processing circuitry configured to determine, in real time, a spectrum of the reflected short-wave-infrared light sensed by the sensor, and determine, in real time, particle characterization for a portion of the drilled particles by performing hyperspectral analysis on the determined spectrum and based on predetermined candidate particle characterizations.

In another aspect, a method of real-time analysis of ore extracted from a drill hole using a drilling machine is disclosed or implemented. The method can comprise determining, in real time, a spectrum of short-wave-infrared energy reflected from a stream of drill cuttings, as the drill cuttings are expelled from the drill hole as the drilling machine drills the drill hole, based on determined density of the stream of drill cuttings; and determining, in real time, minerals found in the stream of drill cuttings by processing spectral data corresponding to the determined spectrum and analyzing the processed spectral data based on predetermined candidate minerals in a database of the predetermined candidate minerals.

And in another aspect a drilling machine is disclosed or provided. The drilling machine can comprise: a dust enclosure to surround a drill hole while the drilling machine is drilling the drill hole, the dust enclosure defining an analysis chamber within which to analyze, in real time, a stream of drill cuttings exiting the drill hole as the drilling machine drills the drill hole; a light illumination source to output short-wave-infrared-band light at a predetermined intensity into the analysis chamber formed by the dust enclosure to illuminate the stream of drill cuttings with the short-wave-infrared-band light; a camera to capture visible-band energy reflected from the stream of drill cuttings illuminated by the light illumination source; a short-wave-infrared-band sensor to sense short-wave-infrared-band energy reflected from the stream of drill cuttings illuminated by the light illumination source; a compressed air source to provide compressed air into the analysis chamber formed by the dust enclosure to form an air barrier separating the stream of drill cuttings from the light illumination source, the camera, and the short-wave-infrared-band sensor; and processing circuitry configured to determine, in real time, a spectrum of the short-wave-infrared-band energy reflected from the stream of drill cuttings based on determined density of the stream of drill cuttings from the visible-band energy reflected from the stream of drill cuttings captured by camera, and determine, in real time, a content of minerals of the stream of drill cuttings by processing spectral data corresponding to the determined spectrum and analyzing the processed spectral data based on predetermined candidate minerals in a database of the predetermined candidate minerals for the drill hole.

Other features and aspects of this disclosure will be apparent from the following description and the accompanying drawings.

DETAILED DESCRIPTION

The present disclosure relates to real-time analysis of rock cuttings, and more particularly to systems, methods, and apparatuses for real-time characterization of rock cuttings ejected from a drill hole during a drilling operation of a drilling machine.

Figure 1:
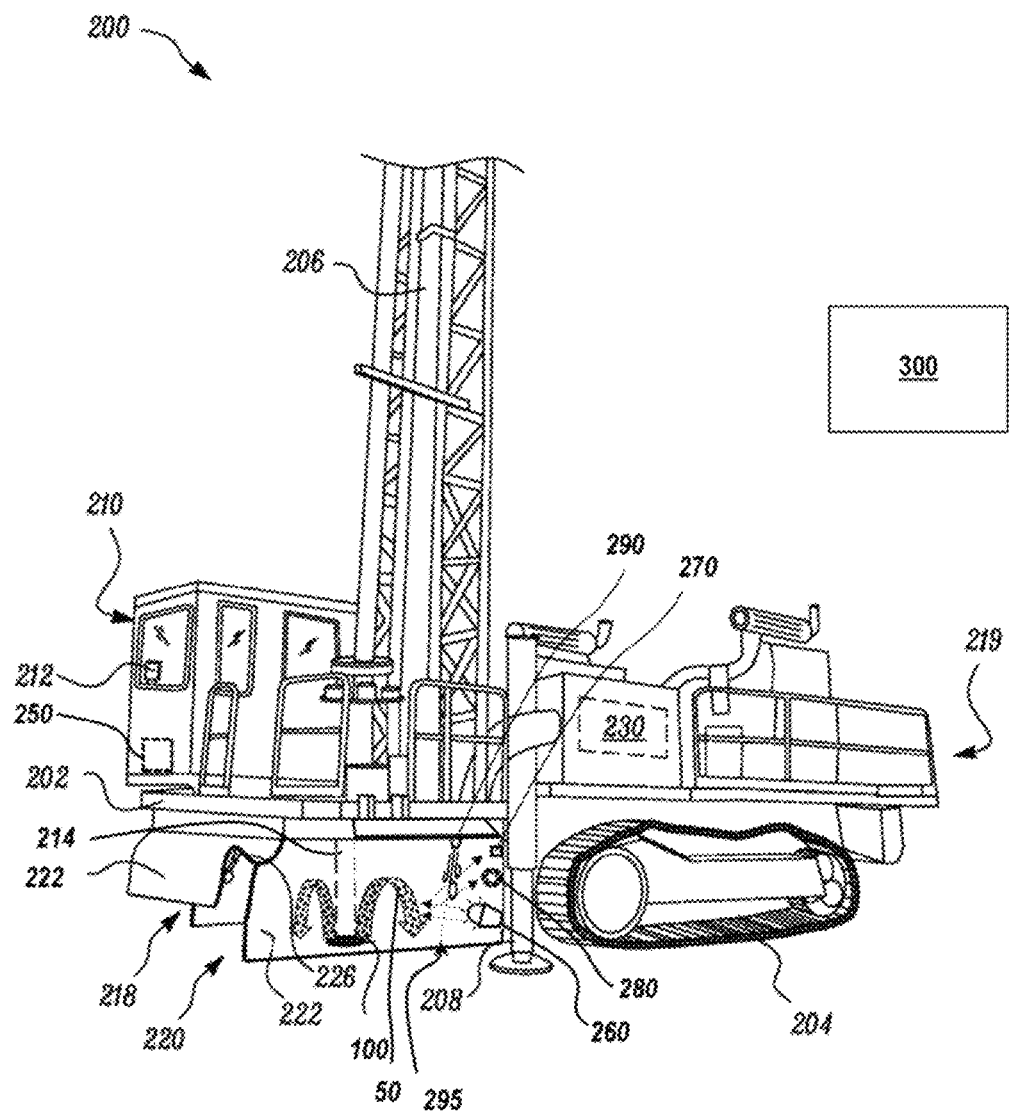
FIG. 1 shows a drilling machine according to one or more embodiments of the disclosed subject matter.

FIG. 1 illustrates a drilling machine 200 in accordance with one or more embodiments of the present disclosure. The drilling machine 200 can be configured to operate on a worksite such as a construction site or a mining site. The drilling machine 200 can be manually, autonomously, or semi-autonomously operated. Moreover, the drilling machine 200 can be locally controlled at the worksite via operator input (manual and/or wireless) and/or remotely controlled from a location remote from the worksite, such as a back office system 300. The communication between the drilling machine 200 and the back office system 300 may be via wired and/or wireless systems.

The drilling machine 200 can include a frame 202 supported on a transport mechanism, such as crawler tracks 204 in a rear portion 219 of the drilling machine 200, as illustrated in FIG. 1, for instance. The drilling machine 200 may further include a mast 206 mounted on the frame 202 and supported about a pivot. The drilling machine 200 may also include jacks 208 that may be extended to support (including level) the drilling machine 200 for a drilling operation. The drilling machine 200 may further include a cabin 210. Optionally, an operator control interface 212 may be provided in the cabin 210 to control at least some operations of the drilling machine 200. The operator control interface 212 may include a display device to display to an operator visual data of operating conditions of the drilling machine 200 and/or analysis performed by components of the drilling machine 200. The visual data may include information regarding analysis of cuttings 50 (e.g., rock cuttings or chips) exiting a drill hole 100 during a drilling operation to drill the drill hole 100. For instance, the visual data may include characterizations and/or quality information pertaining to the cuttings 50 as the drilling machine 200 drills the drill hole 100. According to one or more embodiments, the visual data may include a mapping or mappings of the characterizations and/or quality of the cuttings 50 in relation to depth of the drill hole 100 from where cuttings 50 originated in the drill hole 100.

The drilling machine 200 can also include a work tool 214, supported by the mast 206, for performing the drilling operation. The work tool 214 may include a rotary drill bit (e.g., a rotary tricone drill bit). The work tool 214 may be rotated via one or more electric motors of the drilling machine 200 or via a hydraulic system of the drilling machine 200. Thus, the drilling machine 200 may be characterized as an electric drilling machine (full or partial electric) or a hydraulic drilling machine (e.g., a hydraulic rock drill).

Generally, the drilling machine 200 can be configured to drill the drill hole 100 in earthen material below the drilling machine 200 using the work tool 214 and corresponding components (e.g., drill string, etc.). Such drilling operation of the drilling machine 200 may be referred to as a rock cutting operation, since the earthen material being drilled by the drilling machine 200 can be formed at least partially of rock. The drill hole 100 may be referred to as a blasthole 100 or a probe hole 100 and can be vertical or substantially vertical.

As the work tool 214 drills the drill hole 100, the cuttings 50, also referred to herein as drill cuttings (e.g., rock cuttings or chips), can be expelled at a collar (i.e., an initial opening of the drill hole 100) of the drill hole 100, such as diagrammatically shown in FIG. 1, as the drilling machine 200 progressively drills the drill hole 100. The cuttings 50 may be expelled from the drill hole 100 using air (e.g., a stream of compressed air) output at a bottom end of the work tool 214 (e.g., a bottom face of a rotary drill bit) as the work tool 214 progressively drills the drill hole 100. As non-limiting examples, the cuttings 50 may exit the drill hole 100 at or about at a velocity of 5000 ft./min or 60 mph. Accuracy of measurements and/or analysis regarding location identification within the drill hole 100 for the cuttings 50 exiting the drill hole 100 can be according to millimeter accuracy, for instance, within at or about 1 mm to at or about 2 mm.

The cuttings 50 exiting the drill hole 100 may be in the form of a stream or column of cuttings 50. Dust particles may be intermixed with the stream of cuttings 50 or otherwise around the stream of cuttings 50. The cuttings 50 may be allowed to fall around the drill hole 100 so as to form a mound. The mound may be referred to as a turkey nest. Optionally, at least a portion of the stream of cuttings 50 may contact a portion of the drilling machine 200 (e.g., an underside of the drilling machine 200) prior to being deposited on the ground surface around the drill hole 100.

According to one or more embodiments, some or all of the stream of cuttings 50 may be free of or without any liquids (e.g., water, drilling fluid chemical additive, etc.) added to the drill hole 100 by the drilling machine 200 or an associated drilling system for the drilling operation or otherwise. However, according to one or more embodiments, water, for instance, may naturally exist in the ground and/or drill hole (e.g., groundwater and/or rain). In any case, the stream of cuttings 50 may be moving relatively fast, as noted above, as relatively distinct, non-saturated with liquid (or substantially non-saturated) particles, in contrast to a slurry mixture, for instance.

The drilling machine 200 may include a dust containment system 218 provided below the frame 202. The dust containment system 218 can include an enclosure 220 defined, at least in part, by a plurality of walls 222 (e.g., four walls 222 in the form of a square or rectangle in an overhead plan or bottom plan view), provided around the work tool 214 as the work tool 214 drills the drill hole 100. Optionally, the walls 222 may be referred to or characterized as a shroud, a guard, or a hood. According to one or more embodiments, one, some, or all of the walls 222 can be curtains (or curtain portions) or tarps (or tarp portions), for instance, formed of a somewhat flexible material (e.g., rubber, in the form of a rubber mat). Such dust containment system 218 can prevent or minimize dust from escaping during the drilling operation. Hence, the enclosure 220 may be referred to as a dust enclosure. The walls 222 may also prevent most or all sunlight from entering the enclosure 220. Thus, the analysis of the cuttings 50 exiting the drill hole 100, according to one or more embodiments of the disclosed subject matter, may not need to take into consideration spectra from sunlight entering the enclosure 220.

The dust containment system 218 may include one or more actuators 226 attached to the frame 202 of the drilling machine 200. The one or more actuators 226 may be connected to one or more of the walls 222. Based on the movement of the actuators 226, the height or open/closed amount of the wall(s) 222 with respect to a ground surface of the worksite can be adjusted. For instance, for the drilling operation any moveable wall 222 may be moved such that a bottom edge thereof is just above the ground surface. In accordance with an embodiment, the actuators 226 may be hydraulically operated. However, the actuators 226 may alternatively be operated pneumatically or mechanically, based on the particular configuration of drilling machine 200.

The drilling machine 200 may also include a dust suppression system 230. The dust suppression system 230 can be configured to control the amount of dust generated and released during the drilling operation performed by the drilling machine 200. For instance, one or more pickup ports may be provided with access to inside the enclosure 220 (e.g., in one or more of the walls 222 and/or a ceiling of the enclosure 220) so dust can be evacuated from within the enclosure 220. According to one or more embodiments, the dust suppression system 230 can be configured to automatically detect and predict dust levels generated by the drilling operation of the drilling machine 200 at the worksite.

A controller 250 of the drilling machine 200, which may represent one or more controllers, can be operatively provided to control various components of the drilling machine 200. For example, the controller 250 can control the drilling operation, including the rotation rate of the work tool 214, the rate or penetration of the work tool 214, retraction of the work tool 214, etc. The controller 250 can also control operation of the jacks 208, the crawler tracks 204, the dust containment system 218, and/or the dust suppression system 230. Optionally, the controller 250 can be operatively coupled to the operator control interface 212. Thus, some or all of such control can be via operator input to the operator control interface 212. Control information pertaining to the operation of the drilling machine 200 can also be sent to the operator control interface 212 via the controller 250.

The controller 250 can communicate with the operator control interface 212. As noted above, the operator control interface 212 can allow the operator to control various operations of the drilling machine 200, including some or all aspects of the drilling operation of the drilling machine 200. As examples, the operator control interface 212 can include one or more operator-controlled input devices, such as graphical user interface(s), joysticks, levers, foot pedals, and other actuators. The operator control interface 212 can also include a display device (which may provide the graphical user interface(s)). The display device may show various operating conditions of or associated with the drilling machine 200.

The controller 250 can be included in the drilling machine 200 (e.g., mounted on a component of the drilling machine 200), such as shown in FIG. 1. Additionally or alternatively, the controller 250, or portion thereof, may be a separate component positioned remote from the drilling machine 200 (e.g., as part of a remote control device or station for the drilling machine 200, such as the back office system 300).

The controller 250, which can be implemented in circuitry entirely or partially, can include one or more electronic processors, a non-transitory computer-readable media, and one or more input/output interfaces. The electronic processor(s), the computer-readable media, and the input/output interface(s) can be connected by one or more control and/or data buses that allow the components to communicate. It should be understood that the functionality of the controller 250 can be combined with one or more other controllers to perform additional functionality. Additionally or alternatively, the functionality of the controller 250 can be distributed among more than one controller.

The controller 250 can also control processing regarding the analysis of the cuttings 50 exiting the drill hole 100 according to one or more embodiments of the disclosed subject matter. Hence, the portion or portions of the controller 250 that perform the analysis of the cuttings 50 can be referred to as processing circuitry. According to one or more embodiments, the controller 250 can interface with electronic control circuitry, which may be dedicated to the processing of spectral data, in order to send information to the electronic control circuitry regarding the various operations that the drilling machine 200 is executing, as well as to receive information from the electronic control circuitry regarding quality, characterizations, etc. pertaining to the stream of cuttings 50.

The computer-readable media can store program instructions and data. The electronic processor(s) can be configured to retrieve instructions from the computer-readable media and execute, among other things, the instructions to perform operations or functions pertaining to the analyses of the flow of the cuttings 50 according to one or more embodiments of the disclosed subject matter. The input/output interface(s) can transmit data from the controller 250 to systems, networks, and devices located remotely or onboard the drilling machine 200 (e.g., over one or more wired and/or wireless connections). The input/output interface(s) can also receive data from systems, networks, and devices located remotely or onboard the drilling machine 200 (e.g., over one or more wired and/or wireless connections). The input/output interface(s) can provide received data to the electronic processor(s) and, in some embodiments, can also store received data to the computer-readable media.

At least one light source 260 can be provided to output light having predetermined characteristics, particularly intensity and wavelength, inside the enclosure 220 toward the stream of cuttings 50 as the cuttings 50 are being expelled from the drill hole 100. According to one or more embodiments, the light source 260 may be considered part of the drilling machine 200. The light output from the light source 260 can be light from a predetermined range, for instance, at or about 0.4-2.5 microns. Thus, according to embodiments of the disclosed subject matter, the light output from the light source 260 can be in the short-wave infrared (SWIR) band. Moreover, the light output from the light source 260 can be of relatively high intensity. For instance, the light source 260 may be or include a halogen lamp or a supercontinuum generation device. Supercontinuum generation devices, generally, may include providing a laser that, through optical processing, has an output spread out over multiple wavelengths, and may be generally higher in intensity than halogen lamp. As non-limiting examples, a supercontinuum generation device may be used where the density of the flow of cuttings 50 is relatively low and higher intensity illumination can produce suitable reflected energy and where the system is trying to detect materials at relatively low concentration levels that may require illumination at higher intensity levels to improve signal to noise characteristics of the measured reflected energy.

In that the light output by the light source 260 can be directed to impact and reflect off the stream of cuttings 50 as the cuttings 50 are being expelled from the drill hole 100, the light can thus illuminate the cuttings 50 between a point where the cuttings 50 exit the drill hole 100 and a point where the cuttings 50 are distributed on the ground surface (or preceding cuttings) around the collar of the drill hole 100. Hence, the light source 260 may be referred to or characterized as a light illumination source (for illuminating the moving cuttings 50). The processing involving the analysis of the cuttings 50 exiting the drill hole 100, according to one or more embodiments of the disclosed subject matter, may be facilitated because the spectrum of the light output by the light source 260 (and any other illumination source (e.g., sunlight, etc.)) is known.

At least one sensor 270, which can include optics 272 (e.g., collection and/or focusing), as well as a spectrometer 275 (see FIG. 2), can be provided to receive light output from the light source 260 that is reflected off the cuttings 50 as the cuttings 50 are expelled from the drill hole 100. Generally, the optics 272 can collect and focus the reflected energy to the spectrometer 275, for instance, by way of one or more transmission lines 273 (e.g., one or more optical fibers) (see FIG. 2). According to one or more embodiments, the sensor 270 may be considered part of the drilling machine 200. As noted above, the light output by the light source 260 can contain short-wave infrared (SWIR) energy. Hence, the sensor 270 can sense or detect reflected light in the short-wave infrared band. The sensor 270, therefore, according to one or more embodiments, can be referred to or characterized as a short-wave infrared sensor. Such sensing by the sensor 270 can be performed in real time.

Optionally, a camera 280 can be provided to capture, in real time, images of the cuttings 50 as the cuttings 50 are expelled from the drill hole 100 and illuminated by the light source 260. According to one or more embodiments, the camera 280 may be considered part of the drilling machine 200. In that the cuttings 50 can be moving relatively fast as noted above, the camera 280, which can capture visible-band energy reflected from the stream of cuttings 50, can be referred to or characterized as a high-speed video camera. Moving image data from the camera 280 can be processed, in real time, to determine a density of the stream of cuttings 50 ejected from the drill hole 100 at any point in time. Such density determination can be used when performing hyperspectral analysis of the cuttings 50 in one or more aspects of the entire drill cuttings analysis system, including determining optimal spectrometer averaging parameters, determining an appropriate output rate for the entire drill cuttings analysis system, and/or determining features such as drill cuttings density. According to one or more embodiments the camera 280 may be a so-called smart camera configured to output processed indications such as density versus time to electronic control circuitry.

According to one or more embodiments, an air source 290 can be provided to provide an air barrier or curtain 295 between the stream of cuttings 50 and each of the light source 260, the sensor 270, and the optional camera 280. According to one or more embodiments, the air source 290 may be considered part of the drilling machine 200. Generally, the air source 290 can force air (e.g., compressed air) to a portion of an inner volume of the enclosure 220, via one or more air inlets or nozzles thereof, for instance, to create the air barrier 295 between the stream of cuttings 50 and each of the light source 260, the sensor 270, and the optional camera 280. The air barrier 295 can prevent at least the cuttings 50 from reaching the light source 260, the sensor 270, and the camera 280. The air barrier 295 may also prevent or minimize dust particles from reaching the light source 260, the sensor 270, and the camera 280. Hence, the air barrier 295 can allow unobstructed access, particularly direct line-of-sight access based on the arrangement of the light source 260, the sensor 270, and the camera 280, free or substantially free of intervening particles, for the light source 260, the sensor 270, and the camera 280 to the stream of cuttings 50 exiting the drill hole 100. Moreover, such access may be provided without compromising requirements of the enclosure 220, for instance, for purposes such as dust containment.

Figure 2:
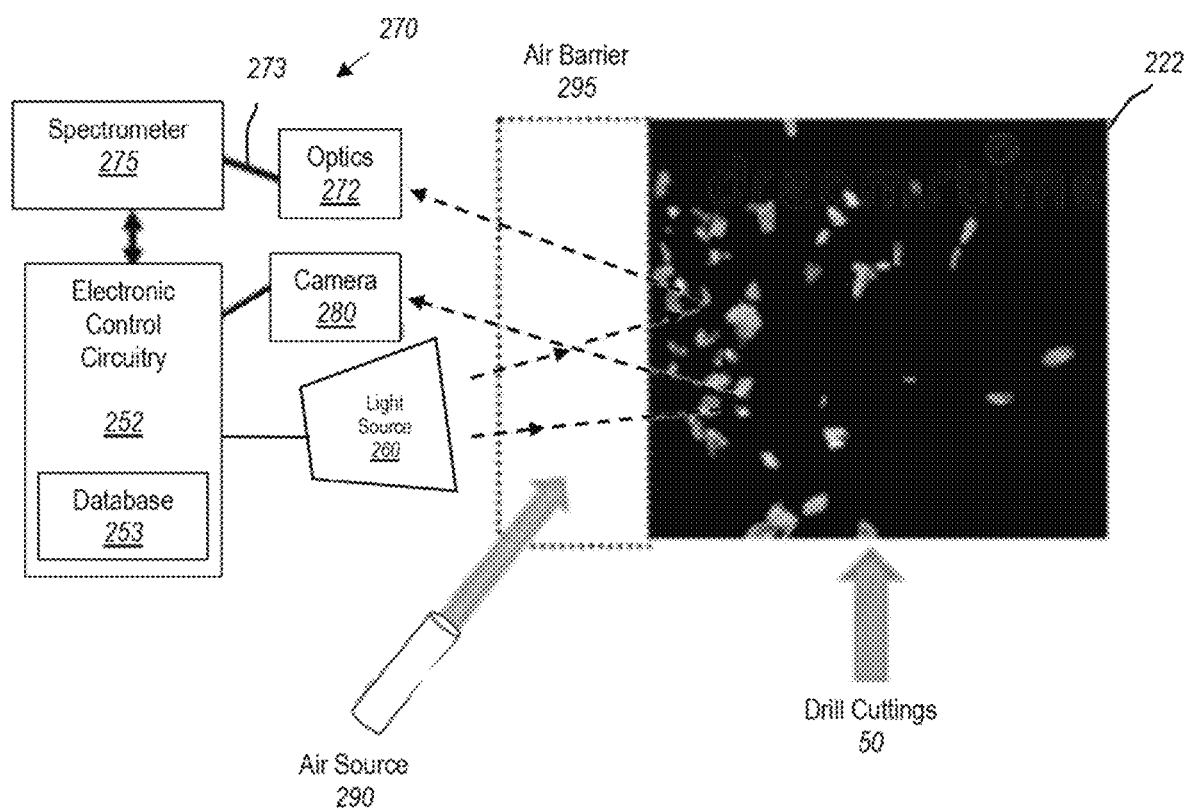
FIG. 2 is a block diagram of a system for analyzing drill cuttings in real time according to one or more embodiments of the disclosed subject matter.

Turning now specifically to FIG. 2, FIG. 2 is a block diagram of a system for analyzing drill cuttings 50 in real time according to one or more embodiments of the disclosed subject matter. The system can include the light source 260 and the sensor 270. The system may also optionally include the camera 280 and/or the air source 290. Electronic control circuitry 252 can be part of the system and operatively coupled to the sensor 270, particularly the spectrometer 275 thereof, and the camera 280. The electronic control circuitry 252 may also be operatively connected to the light source 260, for instance, to control on/off and/or intensity of the level of the light output from the light source 260. The electronic control circuitry 252 and/or the spectrometer 275 may be part of the controller 250 or separate components. The electronic control circuitry 252 may be referred to or characterized as processing circuitry. Likewise, the spectrometer 275 may be referred to or characterized as processing circuitry. Moreover, the combination of the electronic control circuitry 252 and the spectrometer 275 may be referred to or characterized as processing circuitry, even though the functions, processing, etc. of the electronic control circuitry 252 and the spectrometer 275 can be different from each other. Of course, individually the electronic control circuitry 252 and the spectrometer 275 each can be characterized as processing circuitry. Optionally, the sensor 270 and/or the camera 280, which in some respects may be characterized on its own as a sensor, together with the electronic control circuitry 252 may be referred to generally as processing circuitry. Of course, individually the sensor 270, the camera 280, and the electronic control circuitry 252 each can be characterized as processing circuitry.

Regarding layout, the output the light source 260, for instance, short-wave infrared (SWIR) light, can be directed to impact and reflect off the stream of cuttings 50 as the cuttings 50 are being expelled from the drill hole 100, thereby illuminating the cuttings 50 between where the cuttings 50 exit the collar of the drill hole 100 and where the cuttings 50 are deposited on the ground surface. Likewise, the input of the sensor 270 can be directed to receive light from the light source 260 reflected from the cuttings 50 as the stream of cuttings 50 fly past the sensor 270. According to one or more embodiments, the angle of the output of the light source 260 and the angle of the input of the sensor 270 can be different, such as shown in FIG. 2, so the sensor 270 can readily receive the light output by the light source 260 that is reflected from the moving cuttings 50.

Optionally, a tilted and/or light absorbing background may be provided to prevent or lessen the chance that light from the light source 260 will reflect off the background and potentially interfere with the input to the sensor 270 regarding the reflected energy from the cuttings 50. Hence, the stream of cuttings 50 can be between the tilted and/or light absorbing background and each of the light source 260 and the sensor 270. According to one or more embodiments, one or more of the sidewalls 222 of the enclosure 220 opposite the light source 260 may form the tilted and/or light absorbing background. Here, the sidewall 222 can be tilted relative to the angle of the light emitted from the light source 260 and the receiving angle of the sensor 270 such that any reflections off the sidewall 222 are not directed to the sensor 270. The sidewall 222 may additionally or alternatively be formed of or coated with a light absorbing material that can prevent or minimize reflected light from reaching the sensor 270. As a non-limiting example, the tilted and/or light absorbing background may be a black rubber tarp, curtain, or mat that forms the sidewall 222.

According to one or more embodiments, the output of the light source 260 and the input to the sensor 270 can be provided inside the enclosure 220. Likewise, the input to the camera 280 can be provided inside the enclosure 220. In this regard, the output of the light source 260 and the inputs to the sensor 270 and the camera 280 may be via openings in one or more sidewalls 222 of the enclosure 220 (or some other portion of the drilling machine 200). In FIG. 1 the light source 260, the sensor 270, and the camera 280 are shown with the near side sidewall 222 being transparent, but in reality, at least the respective output and inputs may be inside of enclosure 220 or otherwise directed toward the inner volume of the enclosure 220.

The output of the air source 290 (which may include multiple outputs) can also be provided inside of the enclosure 220 or otherwise directed toward the inner volume of the enclosure 220. In this regard, the air source 290 can provide a curtain or barrier of air 295 between the cuttings 50 and dust within the enclosure 220 and each of the output of the light source 260, the input of the sensor 270, and the input of the camera 280, such as shown in FIG. 2.

As noted above, the light source 260 can illuminate the cuttings 50 as the cuttings are expelled from the drill hole 100, and the sensor 270 and the camera 280 can capture reflected light, for instance, short-wave infrared (SWIR) energy and visible-band energy, respectively, as the cuttings 50 pass in front of the sensor 270 and the camera 280. The portion or portions within the enclosure 220 associated with the illumination of the cuttings 50 and the corresponding reflection and capture of the reflected energy can be referred to or characterized as an analysis chamber. According to one or more embodiments, the air barrier 295 may form part of or otherwise be included in the analysis chamber. In this regard, the cuttings 50 may be provided in the analysis chamber as the cuttings 50 climb, as the cuttings 50 are at their peak, or as the cuttings 50 descend.

The sensor 270, as noted above, can include the optics 272 (e.g., collection and/or focusing) and the spectrometer 275. The optics 272 and the spectrometer 275 can be operatively coupled to each other via the one or more transmission lines 273 (e.g., one or more optical fibers). The optics 272 can collect and focus the reflected energy from the cuttings 50 to the spectrometer 275 via the one or more transmission lines 273.

Generally, the spectrometer 275 can process the signals received at the optics 272 to determine or measure the reflected spectrum of the cuttings 50. In some respects the spectrometer 275 can be characterized as receiving reflected energy in (from the optics 272) and outputting spectral data (in a digital format) to the electronic control circuitry 252. Such processing by the spectrometer 275 can be performed in real time and can include concurrent monitoring of each wavelength to obtain a complete spectrum for every period of integration, though in some embodiments not all wavelengths, a couple or several, for instance, may be processed. Limited wavelength processing may be applicable when looking for one particular mineral, for instance, whereas the full spectrum may be employed in other cases, such as when a number of confuser minerals (i.e., minerals not looking for, impurities, etc.) may be present in the cuttings 50. According to one or more embodiments, the processing within the spectrometer 275 to determine the spectrum of the drill cuttings 50 can take 1-2 seconds or less, as an example.

The spectrometer 275 can produce, in real time, the spectrum for the light reflections from the cuttings 50 based on signal averaging, i.e., spectral averaging (e.g., integrate for 100 ms, resulting in 10 spectra out per second). Such spectral averaging may include multiple forms and timings of averaging. The spectral averaging at the spectrometer 275 may be referred to herein as first spectral averaging and may be analog in nature in that the spectral averaging can be based on analog signaling at the sensor 270. According to one or more embodiments of the present disclosure, such spectral averaging can be variable in the amount of spectral averaging. For instance, the electronic control circuitry 252 can send averaging characteristics to the spectrometer 275 to dictate the spectral averaging at the spectrometer 275 based on previous processing results and optionally based on processed results from the camera 280 (discussed in more detail below). Thus, according to one or more embodiments, the first spectral averaging performed by the spectrometer 275 can be directed by the electronic control circuitry 252. Alternatively, or at least in some situations, the spectral averaging performed by the spectrometer 275 can be according to a fixed amount.

According to one or more embodiments, the variable spectral averaging can be based on characterization or characteristics of the stream of cuttings 50 derived based on image data of the stream of cuttings captured by the camera 280. That is, the camera 280 can produce imagery that can be used to characterize the conditions seen in the chamber, as processed by the electronic control circuitry 252. For instance, according to one or more embodiments, the variable spectral averaging can be based on density of the stream of cuttings 50 determined from the image data of the stream of cuttings 50 captured by the camera 280. Put another way, the camera 280 may be employed to characterize the density of the cuttings 50 at any point in time to aid in the selection of the spectral averaging for the spectrometer 275. Thus, according to one or more embodiments of the disclosed subject matter, the distribution and/or size of the moving cuttings 50 can be used to adaptively control the spectral averaging of the outputs of the spectrometer 275. The electronic control circuitry 252 can provide averaging characteristics based on the determined distribution and/or size of the moving cuttings 50 to the spectrometer 275 for control of the spectral averaging of the outputs of the spectrometer 275.

Here, the electronic control circuitry 252 can receive image data from the camera 280 and process the image data to determine, in real time, a density of the stream of cuttings 50 as the cuttings pass by the camera 280. Generally, the more dense that the stream of cuttings 50 is determined to be can result in signaling from the electronic control circuitry 252 to the spectrometer 275 to implement relatively less spectral averaging compared to when the stream of cuttings 50 is determined to be less dense. That is, a time period for the spectral averaging performed by the spectrometer 275 can be inversely proportional to the density of the stream of cuttings 50 determined by the electronic control circuitry 252.

Optionally, when no cuttings 50 are being output from the drill hole 100, this situation can be captured by the camera 280 and may correspond to a zero or relatively low value (e.g., still dust in the air) for the density of the cuttings 50. That is, the identification of few or no cuttings 50 at points in time can allow the system to designate a short-term background spectrum that can be subtracted from any spectrum containing cuttings 50. This can highlight the spectrum of the cuttings 50 and minimize the contributions of the background and/or dust. Thus, such situation can be used to calibrate the sensor 270 and/or the camera 280 with respect to light reflections not caused by the flow of cuttings 50, such as from one or more sidewalls 222 of the enclosure 220, the tilted and/or light absorbing background material, and/or dust particles that may remain from previous operation of the work tool 214.

According to one or more embodiments, additional averaging of spectra, at least of spectra coming out at that integration time, can be performed based on the variable spectral averaging performed by the spectrometer 275. This additional averaging may be viewed as averaging multiple first spectral averages of the spectrometer 275. Such averaging may be referred to herein as post-processing or second spectral averaging and may be digital in nature, for instance, performed by the electronic control circuitry 252 and/or by the spectrometer 275 as commanded by the electronic control circuitry 252. Thus, according to one or more embodiments, additional, i.e., second (in this case digital) spectral averaging can take place at the spectrometer 275 and no additional (digital) spectra averaging can take place at the electronic control circuitry 252, or, alternatively, additional, i.e., second (in this case digital) spectral averaging can take place at the spectrometer 275 and additional, i.e., third (digital) spectra averaging can take place at the electronic control circuitry 252. As an example, using the spectral averaging time of 10 ms mentioned above, the post-processing can average a group of these spectra together for relatively longer periods of time. Such averaging can be made in light of signal-to-noise ratio performance considerations. However, the longer period of time may not be so long that the averaging mixes spectra from different layers and potentially different materials of the drill hole 100.

The electronic control circuitry 252 can perform analysis on the spectral data to determine qualities of the cuttings 50, such as quality of ore, representative minerals/content of minerals, etc. According to one or more embodiments, quality can be or include characteristics, characterizations, and/or classification of the cuttings 50. Such spectral analysis may be performed in real time by the electronic control circuitry 252. The electronic control circuitry 252 can implement hyperspectral analysis processing (e.g., one or more algorithms) to process the spectral data to determine the qualities of the cuttings 50. According to one or more embodiments, the hyperspectral analysis algorithm can be or include spectral linear unmixing processing (e.g., a supervised, fully-constrained approach).

The spectral analysis processing can include analyzing (e.g., comparing) the spectral data from the spectrometer 275 based on (e.g., to) spectra of predetermined candidate minerals. The inputs for the spectral analysis processing, therefore, can be the spectral data from the spectrometer 275 and the predetermined candidate minerals. Optionally, the incoming spectral data may be preprocessed to remove spectral values of any background material, such as the tilted and/or light absorbing background (e.g., one of the sidewalls 222) and/or dust or dirt accumulated in the enclosure 220 or on a portion of the enclosure such as one or more of the sidewalls 222. Additionally or alternatively, preprocessing can be performed to account for spectral properties of the light from the light source 260 and/or any sunlight or other light that may be present at the chamber for analyzing the stream of cuttings 50.

The spectra of candidate minerals can be provided in a database 253 of the electronic control circuitry 252 or otherwise accessible by the electronic control circuitry 252. The database 253, which may be referred to or characterized as a spectral database, may be a so-called library of known or expected minerals at the worksite, or even specific to the particular drill hole 100. In this regard, it may be the case that the database 253 may inadvertently not include all of the minerals found in the cuttings 50 (this may be unknown to the system, i.e., that an unknown mineral will exist in the cuttings 50). However, satisfactory quality analysis may be such that not all of the minerals need to be identified. For instance, the system may satisfactorily analyze the qualities of the cuttings 50 exiting the drill hole 100 if a predetermined threshold is met, for instance, 98% of the minerals have been identified, excluding contaminants such as mud.

As noted above, according to one or more embodiments, some or all of the stream of cuttings 50 may be free of or without any liquids (e.g., water, drilling fluid chemical additive, etc.) added to the drill hole 100 by the drilling machine 200 or an associated drilling system for the drilling operation or otherwise. Hence, the spectral analysis processing performed by the electronic control circuitry 252 may not need to factor in such additives in order to determine the qualities of the cuttings 50. However, according to one or more embodiments, water, for instance, may naturally exist in the ground and/or drill hole (e.g., groundwater and/or rain). Therefore, the spectral analysis processing performed by the electronic control circuitry 252, according to one or more embodiments of the disclosed subject matter, can factor in the effects of naturally occurring water on the cuttings 50. In this regard, the moisture on the cuttings 50 can be measured in real time so the spectral processing can adjust the processing to take into account any alterations to the spectra of the cuttings 50 due to measured moisture.

According to one or more embodiments, the results of the spectral analysis can include a list of minerals found in the stream of cuttings 50. For instance, the minerals may be listed as a percentage for each analyzed, i.e., averaged, portion or segment of the stream of cuttings 50 (e.g., X % of mineral A; Y % of mineral B . . . ). As noted above, the minerals may be derived from known, predetermined candidate materials stored in the database 253.

Referring again to FIG. 1, the controller 250 can also be operatively coupled to a hole depth sensor. Generally, the hole depth sensor can measure depth of the drill hole 100 as the drill hole 100 is being drilled. As examples, such hole depth sensor can sense position of the work tool 214 and/or a motor (e.g., electric motor) driving the work tool 214 to determine depth of the work tool 214 and hence the drill hole 100 as the drill hole 100 is drilled. The controller 250 can use depth data from the hole depth sensor to associate depth of the drill hole 100 with identified qualities of the stream of cuttings 50 from the corresponding depth within the drill hole 100. Thus, according to embodiments of the disclosed subject matter, the real time update rate of the spectral analysis for the stream of cuttings 50 can be consistent with the drilling depth rate and the required resolution for real time material quality identification.

In that embodiments of the disclosed subject matter can determine quality of cuttings 50 in correspondence with depth from where the cuttings 50 originated in the ground, the controller 250 can map or log the determined quality of the cuttings 50 to the depth in the ground from where the cuttings 50 originated. Such mapping can be performed in real time.

The results of the analysis characteristics/qualities analysis performed by the electronic control circuitry 252 may be displayed in real time on one or more display devices, such as a display device of the operator control interface 212 of the drilling machine 200 and/or an offboard display device, such as a display device at the back office system 300. Such display may also include a mapping of the determined quality of the cuttings 50 to the depth in the ground from where the cuttings 50 originated. Thus, the association can represent depth or depths within the drill hole 100 having certain qualities derived from the analyzed cuttings 50 from the depth(s). Each individual drill hole 100 mapping may be combined to create an overall mapping for an area of the worksite or the entire worksite.

Cuttings 50 quality information can be offloaded from the drilling machine 200, for instance, to the back office system 300. Such offloading can be via a wired and/or wireless network and can be performed in real time or after (e.g., upon) completion of the drilling operation to drill the drill hole 100. Accordingly, according to one or more embodiments, the quality information for one or more drill holes 100 may be stored at the drilling machine 200, for instance, by the controller 250. According to one or more embodiments, the quality information can be offloaded as a mapping or a log, such as described above. Optionally, the quality information can be formatted in a batch file and offloaded.

INDUSTRIAL APPLICABILITY

As noted above, the present disclosure relates to characterization of rock cuttings, and more particularly to systems, methods, and apparatuses for real-time characterization of rock cuttings ejected from a drill hole during a drilling operation of a drilling machine.

One or more embodiments of the disclosed subject matter can involve or implement real-time ore characterization using hyperspectral analysis of blasthole drill cuttings. This can involve the real-time analysis of reflected energy in the Shortwave Infrared (SWIR) band from cuttings as the cuttings exit the surface from a blasthole drill. The cuttings initially can be illuminated under high-intensity lighting source with sufficient output in the SWIR band. The reflected energy can be directed to a SWIR spectrometer, where the spectrum can be acquired using a variable amount of signal averaging. A high-speed visible camera can optionally be employed to characterize the density of the cuttings at any point in time to aid in the selection of the spectral averaging. A hyperspectral analysis algorithm can then process the spectral data to determine the content of minerals at any point in time from a spectral database of possible minerals. Special provisions, such as the positioning of components and the providing of an air barrier or curtain, can be made to allow the illuminator and the collection optics to have a direct view of the cuttings as they exit the surface.

Embodiments of the disclosed subject matter can provide for real-time analysis of the formation as the formation is drilled, particularly in a case where the cuttings are flying out of the drill hole and past the sensing components at a relatively fast rate (e.g., at or about at a velocity of 5000 ft./min or 60 mph), by way of averaging the sampling due to speed of movement of the cuttings, where the averaging can be variable based on the density of the stream of cuttings. As noted above, some or all of the stream of cuttings may be free of or without any liquids (e.g., water, drilling fluid chemical additive, etc.) added to the drill hole by the drilling machine or an associated drilling system for the drilling operation or otherwise.

Figure 3:
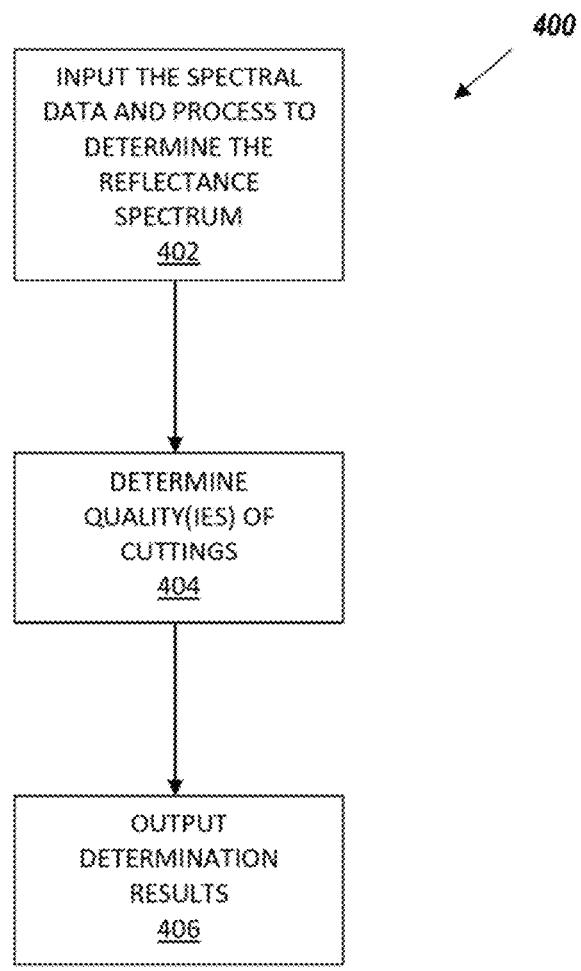
FIG. 3 is a flow chart of a method for real-time analysis of drill cuttings according to one or more embodiments of the disclosed subject matter.

FIG. 3 shows a block diagram of a method 400 according to one or more embodiments off the disclosed subject matter. Some or all of the method 400 can be performed using a non-transitory computer-readable storage medium having stored thereon instructions that, when executed by one or more processors (e.g., electronic processor(s) of the controller 250 and/or of the electronic control circuitry 252), cause the one or more processors to perform the method 400.

At 402 the method 400 can including determining, in real time, a spectrum of energy reflected from a stream of cuttings 50 as the cuttings 50 are expelled from a drill hole 100 as a drilling machine 200 drills the drill hole 100. Such processing at 402 may be characterized as inputting the spectral data and processing to determine the reflectance spectrum of the cuttings 50. The source of the energy reflected from the stream of cuttings 50 can be at least one light source 260 that outputs light, for instance, in the short-wave infrared (SWIR) band. And the reflected energy can be captured by a sensor such as sensor 270.

A spectrometer, such as spectrometer 275, can process the signals received at the optics 272, in real time, to determine or measure the reflected spectrum of the cuttings 50. In some respects the spectrometer 275 can be characterized as receiving reflected energy in (from the optics 272) and outputting spectral data (in a digital format) to the electronic control circuitry 252. Such processing can involve signal or spectral averaging. The spectral averaging at the spectrometer 275 may be referred to herein as first spectral averaging and may be analog in nature in that the spectral averaging can be based on analog signaling at the sensor 270.

For instance, the electronic control circuitry 252 can send averaging characteristics to the spectrometer 275 to dictate the spectral averaging at the spectrometer 275 based on previous processing results and optionally based on processed results from the camera 280 (discussed in more detail below). Thus, according to one or more embodiments, the first spectral averaging performed by the spectrometer 275 can be directed by the electronic control circuitry 252. According to one or more embodiments of the present disclosure, such spectral averaging can be variable in the amount of spectral averaging. For instance, the electronic control circuitry 252 can send averaging characteristics to the spectrometer 275 to dictate the spectral averaging at the spectrometer 275 based on previous processing results and optionally based on processed results from the camera 280, particularly density determinations made by electronic control circuitry, such as electronic control circuitry 252, based on reflected visible-band energy of the moving stream of cuttings 50 captured by a camera, such as camera 280. Thus, according to one or more embodiments, the first spectral averaging performed by the spectrometer 275 can be directed by the electronic control circuitry 252, according to averaging characteristics based on the determined distribution and/or size of the moving cuttings 50, to control the spectral averaging of the outputs of the spectrometer 275.

According to one or more embodiments, the operations of 402 of the method 400 can include additional averaging of spectra, at least of spectra coming out at that integration time, based on the variable spectral averaging performed by the spectrometer 275 at 402. This additional averaging may be viewed as averaging multiple first spectral averages of the spectrometer 275. Such averaging may be referred to herein as post-processing or second spectral averaging and may be digital in nature, for instance, performed by the electronic control circuitry 252 and/or by the spectrometer 275 as commanded by the electronic control circuitry 252. Thus, according to one or more embodiments, additional, i.e., second (in this case digital) spectral averaging can take place at the spectrometer 275 and no additional (digital) spectra averaging can take place at the electronic control circuitry 252, or, alternatively, additional, i.e., second (in this case digital) spectral averaging can take place at the spectrometer 275 and additional, i.e., third (digital) spectra averaging can take place at the electronic control circuitry 252.

At 404 the method 400 can including determining, in real time, a quality or qualities of the cuttings 50 associated with the determined spectrum. Qualities of the cuttings 50 can include quality of ore, representative minerals/content of minerals, etc., and, according to one or more embodiments, quality can be or include characteristics, characterizations, and/or classification of the cuttings 50.

The analysis on the spectral data to determine qualities of the cuttings 50 can be performed by the electronic control circuitry 252 implementing hyperspectral analysis processing (e.g., spectral linear unmixing processing). The spectral analysis processing can also include analyzing (e.g., comparing) the spectral data from the spectrometer 275 based on (e.g., to) spectra of predetermined candidate minerals. Thus, inputs for the spectral analysis processing can be the spectral data from the spectrometer 275 and the predetermined candidate minerals. Optionally, an input for the spectral analysis processing can be spectral characteristics of the light output by the light source 260.

Optionally, the incoming spectral data may be preprocessed to remove spectral values of any background material, such as the tilted and/or light absorbing background (e.g., one of the sidewalls 222) and/or dust or dirt accumulated in the enclosure 220 or on a portion of the enclosure such as one or more of the sidewalls 222. Additionally or alternatively, preprocessing can be performed to account for spectral properties of the light from the light source 260 and/or any sunlight or other light that may be present at the chamber for analyzing the stream of cuttings 50.

The spectra of candidate minerals can be provided in a database, such as database 253 of the electronic control circuitry 252, or otherwise accessible by the electronic control circuitry 252. The database 253, which may be referred to or characterized as a spectral database, may be a so-called library of known or expected minerals at the worksite, or even specific to the particular drill hole 100, according to one or more embodiments of the disclosed subject matter.

As noted above, according to one or more embodiments, some or all of the stream of cuttings 50 may be free of or without any liquids (e.g., water, drilling fluid chemical additive, etc.) added to the drill hole 100 by the drilling machine 200 or an associated drilling system for the drilling operation or otherwise. Hence, the spectral analysis processing performed by the electronic control circuitry 252 may not need to factor in such additives in order to analyze the cuttings 50. However, according to one or more embodiments, water, for instance, may naturally exist in the ground and/or drill hole (e.g., groundwater and/or rain). Therefore, the spectral analysis processing performed by the electronic control circuitry 252, according to one or more embodiments of the disclosed subject matter, can factor in the effects of naturally occurring water on the cuttings 50. In this regard, the moisture on the cuttings 50 can be measured in real time so the spectral processing can adjust the processing to take into account any alterations to the spectra of the cuttings 50 due to measured moisture.

According to one or more embodiments, the results of the spectral analysis can include a list of minerals found in the stream of cuttings 50. For instance, the minerals may be listed as a percentage for each analyzed, i.e., averaged, portion or segment of the stream of cuttings 50 (e.g., X % of mineral A; Y % of mineral B . . . ). As noted above, the minerals may be derived from known, predetermined candidate materials stored in the database 253. One or more embodiments of the disclosed subject matter can determine quality of cuttings 50 in correspondence with depth from where the cuttings 50 originated in the ground.

At 406 the method 400 can include outputting the results of the determined quality or qualities of the cuttings 50. Such outputting can be in real time, for instance, onboard and/or offboard the drilling machine 200. Thus, the results of the analysis characteristics/qualities analysis performed by the electronic control circuitry 252 may be displayed in real time on one or more display devices, such as a display device of the operator control interface 212 of the drilling machine 200 and/or an offboard display device, such as a display device at the back office system 300. As noted above, the quality or qualities of the cuttings 50 can be mapped relative to the depth in the ground from where the cuttings 50 originated. As such, the mapping may also be outputted on the display device(s).

Cuttings 50 quality information can be offloaded from the drilling machine 200, for instance, to the back office system 300. Such offloading can be via a wired and/or wireless network and can be performed in real time or after (e.g., upon) completion of the drilling operation to drill the drill hole 100. Accordingly, according to one or more embodiments, the quality information for one or more drill holes 100 may be stored at the drilling machine 200, for instance, by the controller 250. According to one or more embodiments, the quality information can be offloaded as a mapping or a log, such as described above. Optionally, the quality information can be formatted in a batch file and offloaded.

The operations 402-406 can be performed for one or more additional drill holes 100. Quality information pertaining to a set of drill holes 100 at the worksite can be mapped, for instance, by the back office system 300, to map an area of the worksite or the entire worksite and corresponding ore quality thereof. Thus, the ability to accurately classify drill cuttings as they are discharged from the hole can provide input stored for the planning of a mining operation by assessment of the contents of the rock at various depths in the drilling.

As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A drilling machine comprising:
   a dust enclosure to surround a drill hole while the drilling machine is drilling the drill hole, the dust enclosure defining an analysis chamber within which to analyze, in real time, a stream of drill cuttings exiting the drill hole as the drilling machine drills the drill hole;
   a light illumination source to output short-wave-infrared-band light at a predetermined intensity into the analysis chamber formed by the dust enclosure to illuminate the stream of drill cuttings with the short-wave-infrared-band light;
   a camera to capture visible-band energy reflected from the stream of drill cuttings illuminated by the light illumination source;

a short-wave-infrared-band sensor to sense short-wave-infrared-band energy reflected from the stream of drill cuttings illuminated by the light illumination source;
a compressed air source to provide compressed air into the analysis chamber formed by the dust enclosure to form an air barrier separating the stream of drill cuttings from the light illumination source, the camera, and the short-wave-infrared-band sensor; and
processing circuitry configured to
determine, in real time, a spectrum of the short-wave-infrared-band energy reflected from the stream of drill cuttings based on determined density of the stream of drill cuttings from the visible-band energy reflected from the stream of drill cuttings captured by camera, and
determine, in real time, a content of minerals of the stream of drill cuttings by processing spectral data corresponding to the determined spectrum and analyzing the processed spectral data based on predetermined candidate minerals in a database of the predetermined candidate minerals for the drill hole.

2. The drilling machine according to claim 1, wherein the dust enclosure forms a light-absorbing background such that the stream of drill cuttings illuminated by the light illumination source is between the light-absorbing background and the light illumination source.

3. The drilling machine according to claim 1, wherein the light illumination source is a halogen lamp or a supercontinuum generation device.

4. The drilling machine according to claim 1, wherein the stream of drill cuttings is free of any liquid added to the stream of drill cuttings and the drill hole by the drilling machine for drilling operations associated with the drilling machine drilling the drill hole.

5. The drilling machine according to claim 1, wherein the processing circuitry is configured to
map, in real time, the determined content of minerals in relation to depth of the drill hole as the drilling machine drills the drill hole, and
control output of the map on a display device.

6. The drilling machine according to claim 1,
wherein the spectrum is determined using spectral averaging, and
wherein a time period for the spectral averaging is inversely proportional to the determined density of the stream of drill cuttings.

7. The drilling machine according to claim 1,
wherein a first portion of the processing circuitry forms part of the short-wave-infrared-band sensor and is configured to perform a first averaging process to determine the spectrum and at least one additional spectrum,
wherein a second portion of the processing circuitry is part of electronic control circuitry of the drilling machine and is configured to perform another averaging process as a post-process to average the spectrum and the at least one additional spectrum, and
wherein the electronic control circuitry determines the content of the minerals using as the spectral data of the second averaging process.

8. A method of real-time analysis of ore extracted from a drill hole using a drilling machine, the method comprising:
determining, in real time, a spectrum of short-wave-infrared energy reflected from a stream of drill cuttings, as the drill cuttings are expelled from the drill hole as the drilling machine drills the drill hole, based on determined density of the stream of drill cuttings; and
determining, in real time, minerals found in the stream of drill cuttings by processing spectral data corresponding to the determined spectrum and analyzing the processed spectral data based on predetermined candidate minerals in a database of the predetermined candidate minerals.

9. The method according to claim 8, further comprising, during said determining the spectrum:
illuminating the stream of drill cuttings with short-wave-infrared-band (SWIR) light output from a light illumination source; and
sensing the short-wave-infrared energy reflected from the stream of drill cuttings using a short-wave-infrared-band sensor.

10. The method according to claim 9, further comprising providing an air barrier formed of forced air provided into an internal volume of a dust enclosure surrounding the drill hole, the air barrier being between the stream of drill cuttings and each of the light illumination source and the short-wave-infrared-band sensor,
wherein the stream of drill cuttings is free of any liquid added to the stream of drill cuttings and the drill hole by the drilling machine for drilling operations associated with the drilling machine drilling the drill hole.

11. The method according to claim 8, further comprising determining, in real time, the density of the stream of drill cuttings based on images of the stream of drill cuttings captured by a camera.

12. The method according to claim 8, wherein said determining the spectrum is based on spectral averaging, a time period for the spectral averaging being inversely proportional to the determined density of the stream of drill cuttings.

13. The method according to claim 8, further comprising:
mapping, in real time, a characterization of the drill hole based on the determined minerals in relation to depth of the drill hole as the drilling machine drills the drill hole; and
controlling output of a map created by said mapping on a display device of the drilling machine.

14. A system comprising:
a light illumination source to output short-wave-infrared (SWIR) light toward drilled particles as the drilled particles exit a drill hole being drilled by a drilling machine;
a sensor to sense reflected short-wave-infrared (SWIR) light reflected from the drilled particles exiting the drill hole;
processing circuitry configured to
determine, in real time, a spectrum of the reflected short-wave-infrared light sensed by the sensor, and
determine, in real time, particle characterization for a portion of the drilled particles by performing hyperspectral analysis on the determined spectrum and based on predetermined candidate particle characterizations; and
a camera to capture, in real time, image data corresponding to the drilled particles as the drilled particles exit the drill hole,
wherein the processing circuitry is configured to determine, in real time, a density associated with the drilled particles as the drilled particles exit the drill hole, and
wherein the determining the spectrum is performed using a variable amount of signal averaging based on the determined density.

15. The system according to claim 14, wherein a time period for the signal averaging is inversely proportional to the determined density.

16. The system according to claim 14, further comprising:
a dust enclosure to surround the drill hole while the drilling machine is drilling the drill hole, the dust enclosure defining an analysis chamber within which to analyze the drilled particles, as the drilled particles exit the drill hole, using the light illumination source and the sensor; and
a compressed air source to provide compressed air into the analysis chamber formed by the dust enclosure to form an air barrier separating the light illumination source and the sensor from the drilled particles exiting the drill hole.

17. The system according to claim 14,
wherein the particle characterization includes a set of one or more minerals found in the portion of the drilled particles
wherein a portion of the processing circuitry forms part of the sensor and is configured to perform a first averaging process to determine the spectrum and at least one additional spectrum,
wherein one or more additional averaging processes are performed as a post-process to average the spectrum and the at least one additional spectrum, and
wherein the electronic control circuitry determines the particle characterization for the portion of the drilled particles using data from the second averaging process.

18. The system according to claim 14, further comprising a light-absorbing background formed by a portion of a shroud to be provided around the drill hole, the light-absorbing background being provided such that the drilled particles exiting the drill hole are between the light-absorbing background and each of the light illumination source and the sensor,
wherein the light illumination source is a halogen lamp or a supercontinuum generation device.

* * * * *